United States Patent [19]

Ishida et al.

[11] Patent Number: 5,663,225
[45] Date of Patent: Sep. 2, 1997

[54] RUBBER COMPOSITION AND BELT FOR A POWER TRANSMISSION

[75] Inventors: Kazutoshi Ishida, Suma-ku, Japan; Satoshi Murakami, Ottawa, Ill.; Yoshiaki Onaka, Suma-ku, Japan

[73] Assignee: Mitsuboshi Belting Ltd., Hyogo, Japan

[21] Appl. No.: 676,513

[22] Filed: Jul. 8, 1996

[51] Int. Cl.$^6$ ............................................. C08K 5/21
[52] U.S. Cl. .................... 524/216; 524/211; 524/213; 524/430
[58] Field of Search ............................. 524/211, 213, 524/216, 430

[56] References Cited

U.S. PATENT DOCUMENTS 4,843,124  6/1989  Wolfe, Jr. .................................. 525/92

Primary Examiner—Edward J. Cain
Attorney, Agent, or Firm—Wood, Phillips, VanSanten, Clark & Mortimer

[57] ABSTRACT

A rubber composition including chloroprene rubber, 1–20 weight parts of at least one metal oxide chosen from the group consisting of zinc oxide and magnesium oxide per 100 weight parts of chloroprene rubber, 0.05–2.0 weight parts of a vulcanization accelerator, such as ethylene thiourea, per 100 weight parts of chloroprene rubber, 0.1–10.0 weight parts, and more preferably 0.5–5.0 weight parts, of bismaleimide per 100 weight parts of chloroprene rubber, and 0.1–3.0 weight parts of at least one vulcanization accelerator chosen from among the group consisting of thiazole vulcanization accelerators, thiuram vulcanization accelerators, and sulfenamide vulcanization accelerators per 100 weight parts of chloroprene rubber.

21 Claims, 2 Drawing Sheets

RUBBER COMPOSITION AND BELT FOR A POWER TRANSMISSION

FIELD OF THE INVENTION

This invention relates to power transmission belts, and more particularly, to a rubber composition for use in power transmission belts and having a high cross linking density, a high load transmission capability, and good resistance to premature vulcanization or curing.

BACKGROUND OF THE INVENTION

Conventional belts for power transmission such as toothed belts, V belts, and V-ribbed belts are commonly made of chloroprene rubber due to its excellent heat, oil and ozone resistance, as well as its other desirable mechanical properties. Chloroprene rubber compositions, particularly the sulfur-denatured types, typically include a metal oxide vulcanizing agent such as zinc oxide or magnesium oxide or a metal oxide with a vulcanization accelerator. Chloroprene rubber compositions of the nonsulfur-denatured type often include both a metal oxide and a vulcanization accelerator.

Chloroprene rubber compositions are often used in power transmission belts because they are less tacky on pulley surfaces than other rubber compositions. Often the chloroprene rubber compositions include sulfur to increase the cross linking density of the rubber and carbon black to increase the hardness of the rubber.

However, with chloroprene rubber compositions of the sulfur-denatured type, the addition of sulfur to this rubber composition results in only a slight increase in the cross linking density of the rubber and detrimentally reduces the heat resistance of the rubber.

Additionally, when large amounts of carbon black are added to increase the hardness of the rubber composition, it becomes difficult or impossible to accurately mold the belt tooth parts, especially by the conventional method wherein the rubber is pressed into a mold. Also, when short fibers and carbon block are added together in high concentrations to increase the strength of the rubber, the workability of the rubber becomes poor, it is difficult to develop the desired belt fatigue resistance and tackiness, and heat and bending resistance diminish.

A power transmission belt including a composition of chloroprene rubber, metal oxide and bismaleimide, without short reinforcing fibers, is disclosed in Japanese Patent Publication No. 46698/1986. This belt has an elevated cross linking density and does not cure prematurely.

Japanese Patent Publication No. 63656/1993 discloses a transmission belt made up of chloroprene rubber, a metal oxide, bismaleimide, and aramid short fibers.

With only metal oxide and bismaleimide added to the chloroprene rubber, the cross linking density of the rubber does not rise sufficiently. This composition, when used in friction driving belts, such as toothed belts, V belts, V-ribbed belts, and the like, generally does not result in a good quality belt.

When a toothed belt is required to transmit a heavy load, insufficient hardness of the teeth can cause cracking and tooth loss to occur. When the teeth are subjected to large compressive forces from cooperating pulleys, and are placed under conditions wherein they are subjected to repeated deformation, the tooth root parts are quickly fatigued and cracking and tooth loss can occur. This loss of teeth from the belt impairs the meshing of the teeth and cooperating pulleys, and may cause the belt to jump off the pulleys.

Additionally, with V belts and V-ribbed belts, even with the addition of large amounts of carbon black and short fibers, it has not been possible to adequately improve belt fatigue resistance and belt tackiness.

SUMMARY OF THE INVENTION

The present invention is directed to overcoming one or more of the above discussed problems.

It is an object of the present invention to provide a rubber composition to produce a high quality power transmission belt. The rubber composition, in a frictionally operated belt, such as a toothed belt, V belt, and V-ribbed belt, may be capable of high load transmission. The rubber composition may have a relatively high cross linking density, adequate hardness, and good resistance to premature curing.

In one form, the rubber composition includes chloroprene rubber, 1–20 weight parts of at least one metal oxide chosen from the group consisting of zinc oxide and magnesium oxide per 100 weight parts of chloroprene rubber, 0.05–2.0 weight parts of a vulcanization accelerator, such as ethylene thiourea, per 100 weight parts of chloroprene rubber, 0.1–10.0 weight parts, and more preferably 0.5–5.0 weight parts, of bismaleimide per 100 weight parts of chloroprene rubber, and 0.1–3.0 weight parts of at least one vulcanization accelerator chosen from among the group consisting of thiazole vulcanization accelerators, thiuram vulcanization accelerators, and sulfenamide vulcanization accelerators per 100 weight parts of chloroprene rubber.

The rubber composition may include 5–40 weight parts of a short fiber per 100 weight parts of chloroprene rubber.

The chloroprene rubber may be non-sulfur denatured or sulfur-denatured. In a preferred form, the chloroprene rubber is sulfur-denatured.

The bismaleimide is preferably one of two types—a) one wherein two nitrogen atoms are directly bonded and b) one wherein two nitrogen atoms are bonded by at least an alkalene group, a cycloalkylene group, an oxidimethylene group, a phenylin group, and a sulfide group.

The thiazole vulcanization accelerator may be at least one of 2-mercaptobenzothiazole, 2-mercaptothiazoline, dibenzothiazyl disulfide, and 2-mercaptobenzothiazole zinc salts.

The thiuram vulcanization accelerator may be at least one of tetramethylthiuram monosulfide, tetramethylthiuram disulfide, tetraethylthiuram disulfide, N, N'-dimethyl-N, and N'-diphenylthiuram disulfide.

The sulfenamide vulcanization accelerator may be at least one of N-cyclohexyl-2-benzothiazylsulfenamide, and N, N-cyclohexyl-2-benzothiazysulfenamide.

In one form, the rubber composition includes at least one of carbon black, stearic acid, an extender, a white filler, an antioxidant, nylon, cotton, organic short fibers, and a plasticizer.

The invention further contemplates a power transmission belt with a belt body having a rubber composition as described above.

The power transmission belt can be any of a V belt, a V-ribbed belt, a toothed/cogged belt, and a double-sided toothed/cogged belt.

Load carrying cords may be embedded in the belt body to extend lengthwise thereof.

In the event that the belt body has teeth/cogs, the teeth/cogs may be made at least partially from the rubber composition.

In one form, the belt body has a compression layer and a tension layer and the compression layer is defined at least in part by the rubber composition.

In one form, the belt body has an inside surface and an outside surface and there is a fabric layer on at least one of the inside and outside surfaces of the belt body.

DETAILED DESCRIPTION OF THE PREFERRED EMBODIMENTS

Figure 1:
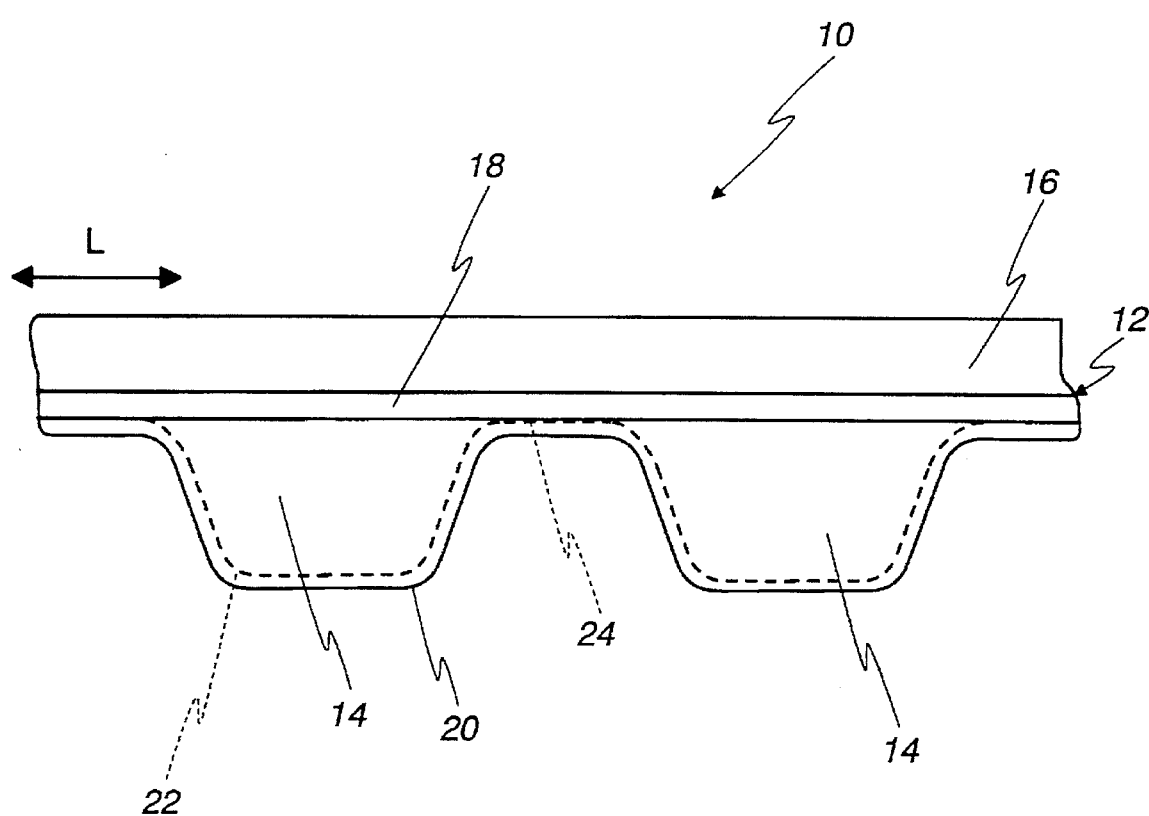
FIG. 1 is a fragmentary, side elevation view of one form of a power transmission belt, according to the present invention.

In one embodiment of the invention, as disclosed in FIG. 1, a toothed belt 10 has a body 12 with a plurality of teeth 14 spaced along the length of the belt, as indicated by the arrow L. The body 12 has a back part 16 with load carrying cords 18 embedded therein. A cloth layer 20 covers the tooth surface 22 and the root area 24.

The load carrying cords 18 are made by twisting together 5 to 9 filaments of E glass or a high strength glass, and treating the filaments with a protective agent such as a rubber composition, RFL liquid adhesive, or the like. The cords 18 may be formed by twisting together 0.5 to 2.5 denier filaments of para aramid organic fiber which deform little under stress and have a high tensile strength. Suitable fibers are sold commercially under the trademarks KEVLAR® and TECHNORA®. These fibers are treated with an RFL liquid adhesive, an epoxy solution, or an isocyanate solution. Other types of fiber are also contemplated by the invention.

The cloth layer 20 has a warp (in the belt width direction) and a weft (in the belt length direction), each including filament thread, or spun thread made up of one, or a combination of, 6 nylon fiber, 66 nylon fiber, polyester fiber, aramid fiber, or the like. It is also desirable that at least a part of the weft be a urethane elastic thread with good stretching capability. The fibers of the cloth layer 20 are woven by a plain weave, twill weave, or satin weave process.

The cloth layer 20 is treated with an RFL liquid, an isocyanate solution, or an epoxy solution. The RFL liquid is an initial condensate of resorcinol and formalin mixed in a latex such as styrene-butadiene-vinylpyridine ternary copolymer, hydrogenated nitrile rubber, chlorosulfonated polyethylene, or epichlorohydrine.

The body 12 of the toothed belt 10, including the back part 16 and the teeth 14, is made up of chloroprene rubber, 1–20 weight parts of at least one metal oxide selected from the group consisting of zinc oxide and magnesium oxide, per 100 weight parts of chloroprene rubber, 0.05–2.0 weight parts of a vulcanization accelerator such as ethylene thiourea, per 100 weight parts of chloroprene rubber, 0.1–10.0 weight parts of bismaleimide per 100 weight parts of chloroprene rubber, and 0.1–3.0 weight parts of at least one vulcanization accelerator chosen from among thiazole vulcanization accelerators, thiuram vulcanization accelerators, and sulfenamide vulcanization accelerators, per 100 weight parts of chloroprene rubber.

The chloroprene rubber may be of the sulfur-denatured or non-sulfur-denatured type. The cross linking effect of the bismaleimide is greater with the sulfur-denatured type.

When the metal oxide is present in an amount less than 1 weight part, crosslinking of the chloroprene rubber is not sufficient. The vulcanization rate and heat resistance are also inadequate. When the metal oxide exceeds 20 weight parts, in the case of zinc oxide, the firmness of the cloth is lost and storage stability diminishes. If magnesium is present in greater than 20 weight parts, the vulcanization rate tends to become too slow.

Ethylene thiourea is a vulcanization accelerator and is used to increase the cross linking effect of the bismaleimide. In order to regulate the vulcanization effect of the ethylene thiourea, and thereby prevent premature curing of the rubber, ethylene thiourea is used in a concentration ranging from 0.05–2.0 weight parts per 100 parts of chloroprene rubber, and a vulcanization accelerator is used. The vulcanization accelerator is chosen from among the group consisting of thiazole vulcanization accelerators, thiuram vulcanization accelerators, and sulfenamide vulcanization accelerators. Typical vulcanization accelerators, such as the above mentioned thiazole, thiuram, and sulfenamide, act to retard the vulcanization process of the chloroprene rubber.

If ethylene thiourea is present in less than 0.05 weight parts, there is not an effective change in the vulcanization rate. When ethylene thiourea is present in more than 2.0 weight parts, curing time is short, working stability is lost, and it becomes difficult, or impossible, to accurately mold belt teeth.

According to the invention, the thiazole vulcanization accelerators preferably include 2-mercaptobenzothiazole, 2-mercaptothiazoline, dibenzothiazyl disulfide, 2-mercaptobenzothiazole zinc salts, and the like.

According to the invention, the thiuram vulcanization accelerators preferably include tetramethylthiuram monosulfide, tetramethylthiuram disulfide, tetraethylthiuram disulfide, N, N'-dimethyl-N, N'-diphenylthiuram, disulfides, and the like.

According to the invention, the sulfenamide vulcanization accelerators preferably include N-cyclohexyl-2-benzothiazylsulfenamide, N, N-cyclohexyl-2-benzothiazylsulfenamide, and the like.

The above vulcanization accelerators are used to retard the vulcanization or curing of the chloroprene rubber which is accelerated by the ethylene thiourea. Premature curing makes difficult, or impossible, accurate tooth formation. If the vulcanization accelerators are used in less than 0.1 weight parts, the vulcanization delaying effect is not sufficient. In excess of 3 weight parts, the vulcanization delaying effect does not increase.

The bismaleimide utilized in the invention includes bismaleimide configurations containing two nitrogen atoms bonded directly to each other, and configurations containing two nitrogen atoms bonded by at least an alkylene group, a cycloalkylene group, an oxydimethylene group, a phenylene group, a sulfolene group, or the like. Specifically, N, N'-ethylene bismaleimide, N, N'-hexamethylene bismaleimide, N, N'-(1.4-phenylene) dimaleimide, N, N'-(m-phenylene) dimaleimide, N, N'-(2.4 tolylene) dimaleimide, 2.6 bis (maleimide methyl)-4-t-butyl phenol, N, N'-oxydimethylene dimaleimide, and the like, can be used.

When the bismaleimide is present in an amount less than 0.1 weight parts, there is no appreciable effect in increasing crosslinking. In an amount greater than 10 weight parts, the bismaleimide blooms.

Most preferably, the bismaleimide is present in an amount of 0.5 to 5 weight parts per 100 weight parts of chloroprene rubber.

Additionally, according to the invention, carbon black, stearic acid, extenders, white fillers, antioxidants, nylon, cotton, organic short fibers such as aramid fibers, plasticizers, and the like, can be suitably blended into the above chloroprene rubber composition, as through use of a banberry mixer, a kneader, a roll, or the like.

The chloroprene rubber composition of the invention has a high cross linking density and hardness, and is prevented from curing prematurely, thereby permitting accurate belt formation. A power transmission belt incorporating this rubber composition can have a high load transmission capability. The rubber composition can be incorporated into many different types of belt.

Figure 2:
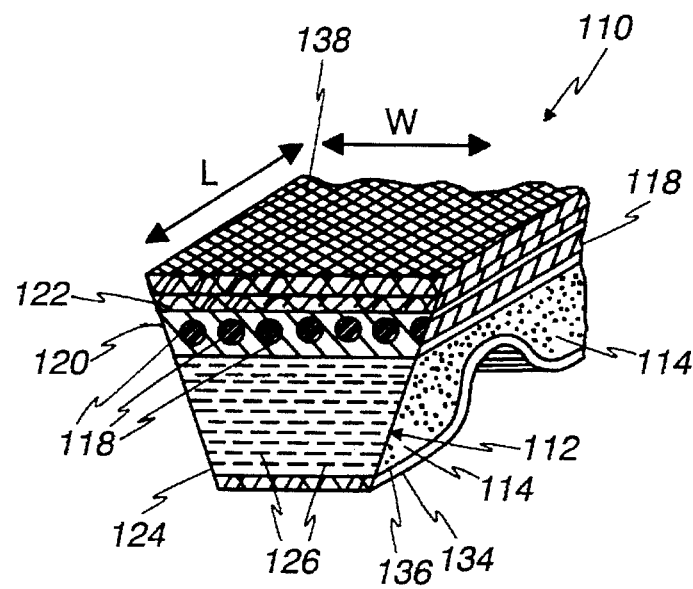
FIG. 2 is a fragmentary, cross-sectional, perspective view of another form of a power transmission belt, according to the present invention.

As illustrated in FIG. 2, another exemplary power transmission belt 110 has a body 112 with a length, as indicated by the arrow L and teeth/cogs 114 spaced lengthwise of the belt body 112. The belt body 112 has load carrying cords 118 extending lengthwise of the belt 110. The load carrying cords 118 are made from highly inextensible, high strength ropes, such as polyester or aramid ropes, and embedded in an adhesive rubber layer 120. A tension layer 122, made from the same material as the adhesive rubber layer, is laminated to the outside of the adhesive rubber layer 120. A compression layer 124, with short fibers 126 embedded therein, is laminated to the inside of the adhesive rubber layer 120. The fibers 126 are aligned along the width (W) of the belt 110. The teeth/cogs 114 are formed in the compression layer 124.

The rubber composition, of at least the compression layer 124, is chloroprene rubber, 1-20 weight parts of a metal oxide selected from the group consisting of zinc oxide and magnesium oxide, per 100 weight parts of chloroprene rubber, 0.05-2.0 weight parts of ethylene thiourea, per 100 weight parts of chloroprene rubber, 0.1-10.0 weight parts of bismaleimide, per 100 weight parts of chloroprene rubber, and 0.1-3.0 weight parts of at least one vulcanization accelerator selected from the group consisting of thiazole vulcanization accelerators, thiuram vulcanization accelerators, and sulfenamide vulcanization accelerators, per 100 weight parts of chloroprene rubber.

The fibers 126 can be made from aramid, nylon, polyester, vinylon, or cotton and are present in an amount of 5 to 40 weight parts per 100 parts of chloroprene rubber in the compression layer 124.

A reinforcing cloth layer 134 may be laminated along the exposed surface 136 of the compression layer 124 with a like cloth layer 138 laminated on the outside of the tension layer 122. The cloth could be provided only on the surface 136, however. Preferably, the reinforcing cloth of the layer 138 is 1 to 6-ply, with the cloth of the layer 134 being 1 to 4-ply.

The cloth in each layer 134, 138 may be a wide angle canvas, wherein the warp and the weft of the canvas intersect at an angle of about 90°–120°. The reinforcing cloth may be treated with an RFL liquid with a rubber composition friction coated thereon to produce a rubberized canvas. The RFL liquid is an initial condensate of resorcinol and formalin mixed in latex with the latex being one of chloroprene, styrene-butadiene-vinylpyridine ternary copolymer, hydrogenated nitrile rubber, NBR, or the like.

Figure 3:
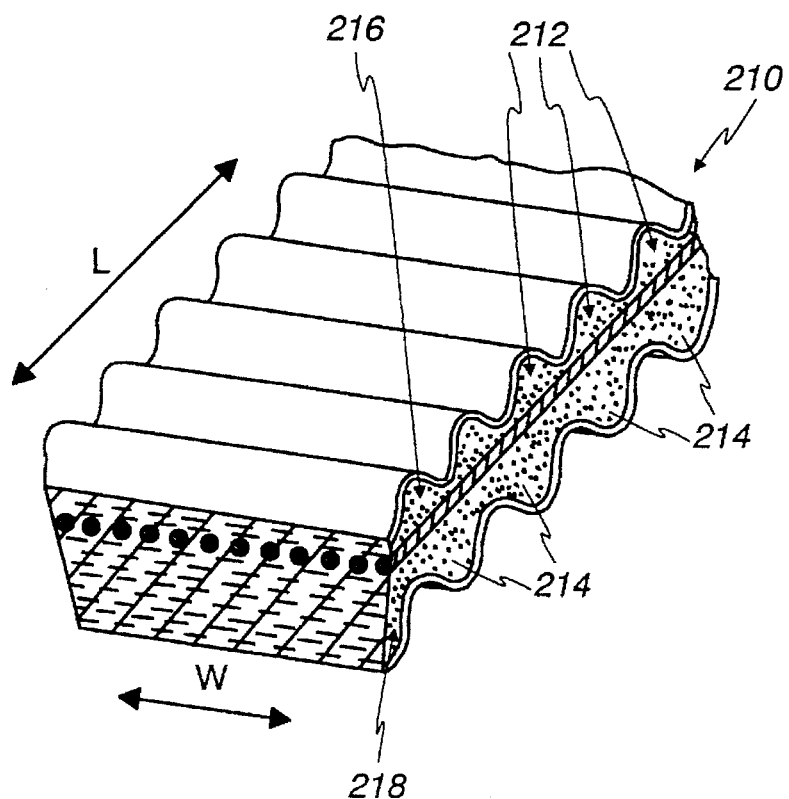
FIG. 3 is a fragmentary, cross-sectional, perspective view of still another form of a power transmission belt, according to the present invention.

The invention may be incorporated into a double-sided, cogged belt, as shown in FIG. 3 at 210. The belt 210 has outer cogs 212 and inner cogs 214 formed in a tension/compression section 216 and a compression/tension section 218. The cogs 212, 214 on both the inside and outside of the belt body extend the full width (W) of the belt 210 and may be aligned with one another or not aligned with one another in a lengthwise direction (L). The inventive rubber components can be in one or both of the sections 216, 218.

The invention can be used in a V-ribbed belt (not shown) with at least two ribs running along the length of the belt in the compression layer/section of the belt.

The following examples are given by way of representation and not limitation.

INVENTIVE EMBODIMENTS 1–3 AND COMPARISON EXAMPLES 1–6

TABLE 1, below, compares nine toothed belts, three (Inventive Embodiments 1-3) containing rubber compositions according to the invention, and six (Comparison Examples 1-6) containing other various rubber compositions not according to the invention. All nine toothed belts were constructed according to the description below.

TABLE 1

| | Inventive Embodiment | | | Comparison Example | | | | | (weight parts) |
|---|---|---|---|---|---|---|---|---|---|
| | 1 | 2 | 3 | 1 | 2 | 3 | 4 | 5 | 6 |
| chloroprene PM-40 | 100 | 100 | 100 | 100 | 100 | 100 | 100 | 100 | 100 |
| nylon cut thread | — | — | — | — | — | 3 | — | — | — |
| MgO | 4 | 4 | 4 | 4 | 4 | 4 | 4 | 4 | 4 |
| stearic acid | 1 | 1 | 1 | 1 | 1 | 1 | 1 | 1 | 1 |
| dibenzothiazole disulfide | 1 | 1 | 1 | — | — | — | — | — | — |
| tetramethyl thiuram disulfide | — | — | 1 | — | — | — | — | — | — |
| antioxidant *1 | 3 | 3 | 3 | 3 | 3 | 3 | 3 | 3 | 3 |
| carbon black N-550 | 40 | 40 | 40 | 40 | 50 | 40 | 40 | 40 | 40 |
| aromatic oil | 5 | 5 | 5 | 5 | 5 | 5 | 5 | 5 | 5 |
| ZnO | 5 | 5 | 5 | 5 | 5 | 5 | 5 | 5 | 5 |
| ethylene thiourea | 0.5 | 0.5 | 1 | 0.5 | 0.5 | 0.5 | — | — | 0.5 |
| bismaleimide *2 | 2 | 5 | 5 | — | — | — | 2 | 5 | 2 |
| Total | 161.5 | 164.5 | 166 | 158.5 | 168.5 | 161.5 | 160 | 163 | 160.5 |

TABLE 1-continued

|  | Inventive Embodiment | | | Comparison Example | | | | | (weight parts) |
| --- | --- | --- | --- | --- | --- | --- | --- | --- | --- |
|  | 1 | 2 | 3 | 1 | 2 | 3 | 4 | 5 | 6 |
| $ML_{1+4}$ (100° C.) | 44 | 46 | 46 | 45 | 61 | 56 | 43 | 44 | 46 |
| MSL (125° C.) T5 | 12 | 12 | 9 | 16 | 13 | 14 | 19 | 20 | 6 |
| hardness $H_S$ (JIS A) | 72 | 74 | 75 | 67 | 74 | 76 | 68 | 67 | 72 |
| 100% modulus (MPa) | 5.1 | 5.8 | 5.8 | 3.8 | 5.9 | 6.6 | 4.2 | 4.0 | 5.3 |
| breaking strength Tb (MPa) | 21.1 | 21.4 | 21.4 | 20.6 | 21.6 | 22.8 | 20.1 | 22.0 | 20.3 |
| breaking elongation Eb (%) | 470 | 440 | 440 | 510 | 430 | 370 | 480 | 520 | 450 |
| belt tooth quality | ★ | ★ | ★ | ★ | + | + | ★ | ★ | ♦ |
| jumping test (torque kgf-m) | 34 | 38 | 38 | 27 | — | — | 29 | 28 | 28 | belt tooth quality: ★ indicates good, ♦ poor and + that accurate teeth could not be molded
*1 octylized diphenylamine
*2 N-N'-m-phenylene dimaleimide A tooth cloth was formed including a warp consisting of 840 denier 6 nylon and a weft consisting of 800 denier, 6 nylon threads, woven into a twill weave fabric. The woven fabric was dipped into RFL liquid, dried and shrunk to a warp density of 80 threads per 5 cm, and a weft density of 67 threads per 5 cm. The woven fabric was then dipped into a rubber glue, which included a chloroprene rubber composition, and dried.

To form load carrying cords, 5 multi-filaments of E glass, having a strand diameter of 9 μm, were aligned, dipped in RFL liquid and dried. The RFL liquid was a protective agent and an adhesive. 15 strands were aligned and upper twisted 4 times per 10 cms to make an S, Z pair twisted cord. The cord construction was 75S-5/13 and the diameter was 2.4 mm.

The tooth cloth was formed into an endless cylinder and set into a metal mold. The S, Z pairs of glass fiber cords were alternatingly wound at a pitch of 2.9 mm and a tension of 16 kgf per cord. Rolled sheets, of the various rubber compositions of Table 1, were wrapped over the cords. The assembly was vulcanized through a conventional press-in vulcanization process. The vulcanized sleeves were cut to predetermined widths to form individual belts.

Each belt had a width of 40 mm and contained 150 teeth. The teeth had a pitch of 14 mm and were an STPD type.

The belts were tested on pulleys having a PLD value of 1.397 mm.

Each belt was trained around a driving pulley having 40 teeth and a driven pulley having 40 teeth. At a temperature of 25° C., the belts were run with the driving pulley operating at a driving speed of 600 r.p.m. The initial belt tension was 60 kg. A varying torque was applied to the driven pulley. A jumping test was performed by increasing the torque on the driven pulley, until each belt jumped from the pulley. The load (torque) required to cause each belt to jump from the pulley was recorded in Table 1.

The external appearance and quality of the belt teeth after molding were observed. The Mooney viscosity, and other vulcanization properties, according to JIS 6300-6301, were obtained and recorded in Table 1.

In the summarized results, as seen in Table 1, the vulcanized rubber of the three inventive embodiments exhibited an increase in hardness and stress resistance. The belts had accurately shaped tooth parts and performed well in the jumping test. Additionally, the vulcanized rubber of the three embodiments showed only a slight decrease in resistance to premature curing or vulcanization.

As is also shown in Table 1, the rubber composition of Comparison Example 1 omits the vulcanization accelerators of the present invention. As a result, the rubber of Comparison Example 1 is softer and more viscous, and resulted in a belt which performed poorly in the jumping test.

Comparison Examples 2 and 3 included high amounts of carbon black and nylon cut thread, respectively, to increase hardness. In both examples, the rubber viscosity increased. The belt teeth of both examples could not be accurately formed. The jumping test could not be performed for either example.

Comparison Examples 4 and 5 included bismaleimide in the rubber composition, but omitted ethylene thiourea. Without ethylene thiourea, the bismaleimide of Examples 4 and 5 did not sufficiently increase the hardness of the vulcanized rubber. Both Comparison Examples 4 and 5 did not perform well in the jumping test.

Comparison Example 6 incorporated both bismaleimide and ethylene thiourea in the rubber composition, but omitted a vulcanization accelerator. As a result, the rubber composition of Comparison Example 6, while hard and stress resistant, more readily cured prematurely, and accounted for poorly molded tooth parts. This belt performed poorly in the jumping test.

INVENTIVE EMBODIMENTS 4–7 AND COMPARISON EXAMPLES 7–10

Table 2, below, compares eight power transmission belts, each containing cogs/teeth on both the inside and outside of the belt body and each having uncovered (raw) side surfaces. The four belts containing rubber compositions embodied in the present invention are labeled Inventive Embodiments 4–7. Four belts contained other various rubber compositions not according to the invention, and are labeled Comparison Examples 7–10. All eight belts were constructed according to the description below.

TABLE 2

| | Inventive Embodiment | | | | Comparison Example (weight parts) | | | |
|---|---|---|---|---|---|---|---|---|
| | 4 | 5 | 6 | 7 | 7 | 8 | 9 | 10 |
| chloroprene PM-40 | 100 | 100 | 100 | 100 | 100 | 100 | 100 | 100 |
| cotton cut thread | 20 | 20 | 20 | 20 | 20 | 20 | 20 | 20 |
| CORNEX ™ cut thread | 10 | 10 | 10 | 10 | 10 | 10 | 10 | 10 |
| stearic acid | 1 | 1 | 1 | 1 | 1 | 1 | 1 | 1 |
| MgO | 4 | 4 | 4 | 4 | 4 | 4 | 4 | 4 |
| octylized diphenylamine | 2 | 2 | 2 | 2 | 2 | 2 | 2 | 2 |
| aromatic oil | 5 | 5 | 5 | 5 | 5 | 5 | 5 | 5 |
| carbon black N-220 | 35 | 35 | 35 | 35 | 35 | 35 | 35 | 35 |
| dibenzothiazyl disulfide | 1 | — | 1 | 1 | 1 | — | 1 | 1 |
| tetramethyl thiuram disulfide | — | 1 | — | — | — | — | — | — |
| ZnO | 5 | 5 | 5 | 5 | 5 | 5 | 5 | 5 |
| ethylene thiourea | 0.5 | 0.5 | 0.5 | 0.5 | — | 0.5 | 0.5 | 2.5 |
| N-N'-m-phenylene dimaleimide | 2.5 | 2.5 | 5 | 0.5 | 2.5 | — | — | 2.5 |
| sulfur | 1 | 1 | 1 | 1 | 1 | 1 | 1 | 1 |
| MSL (125° C.) T5 | 8 | 7.5 | 8.5 | 7.5 | 10 | 4.5 | 8.5 | 3 |
| Vm | 68 | 69 | 69 | 71 | 71 | 125 | 70 | 155 |
| hardness $H_S$ (JIS A) | 91 | 91 | 92 | 90 | 88 | 92 | 86 | 92 |

A load carrying cord of 1,100 denier polyethylene terephthalate was upper/lower reverse twisted with upper and lower twists of 3.0 times/10 cm into a 2×3 twist structure. An untreated cord of 6,600 deniers was thereby prepared.

The resulting cord was treated by being pre-dipped into an isocyanate adhesive made up of 5 wt pts polyisocyanate compound (PAPI-135: M.D. Chemicals Ltd.) and 95 weight parts toluene. The cord was dried at about 180°–190° C., and then dipped in RFL liquid made of chloroprene rubber latex, with there being 14.6 weight parts of resorcinol, 9.2 weight parts of formalin, 1.5 weight parts caustic soda, and 262.5 weight parts of water, per 100 weight parts of chloroprene rubber latex. A drawing thermal setting treatment was carried out at 200° to 240° C. to produce a treated cord.

A canvas reinforcing cloth was made using a spun polymetaphenylene isophthalamide thread (PMIA) (commercially sold under the trademark CORNEX® by Teijin Co. Ltd.) and a spun polyethylene terephthalate thread. The canvas cloth was dipped in the same RFL liquid as used above for the treated cord, and heat treated for two minutes at 150° C. After that, a rubber composition was friction coated to produce a rubberized canvas.

Double-sided, toothed/cogged belts, having the rubber compositions of Table 2, were produced by known methods. Each belt had a 36.5 mm upper width, a 340 mm length, and a 17 mm thickness. Both inside and outside teeth of each belt had a depth of 5 mm and a pitch of 10.7 mm.

One ply of the reinforced canvas cloth, described above, was laminated on the compression layer of all the belts in Table 2. Belts with both aligned inside and outside teeth and nonaligned inside and outside teeth were constructed.

The belts were trained around a driving pulley having a pitch diameter of 150 mm, and a driven pulley of the same pitch diameter. Each belt was run at a temperature of 25° C., with a driving pulley speed of 1800 rpm, an axial load of 350 kgf, and a 40 ps load on the driven pulley. The belts were run until each belt broke down, with the results shown in Table 3.

TABLE 3

| Belt No. | 1 | 2 | 3 | 4 |
|---|---|---|---|---|
| tension on part rubber compound | Inventive Embodiment 3 | Inventive Embodiment 3 | Comparison Example 9 | Comparison Example 9 |
| compression part rubber compound | Inventive Embodiment 3 | Inventive Embodiment 3 | Comparison Example 9 | Comparison Example 9 |
| upper and lower teeth/cogs | aligned | non-aligned | aligned | non-aligned |
| belt running life (mins) | 540 | 360 | 100 | 72 |
| breakdown mode | normal | pop-out | pop-out | upper cog part flying |
| belt temp. during running (°C.) | 160 | 170 | over 200 | over 200 |

The rubber compositions of the four inventive embodiments (4–7), as illustrated in Table 2, all had workable curing rates, exhibited good heat resistance, and had high vulcanized rubber hardness values ranging from 90 to 92. The rubber compositions of all four embodiments were suitable for use in V belts.

In contrast, the rubber compositions of the Comparison Examples had very low heat resistance and cured prematurely. The rubber compositions of the Comparison Examples had low vulcanized hardness values.

Also, as can be seen in Table 3, a V belt having a rubber composition, as shown in the Inventive Embodiment 3, had long running times at high loads, and exhibited excellent durability. This was particularly true of the V belt of Embodiment 3 which had aligned inside and outside teeth/cogs.

INVENTIVE EMBODIMENT 8 AND COMPARISON EXAMPLES 11–13

Table 4, below, compares four V-ribbed, power transmission belts. One belt (Inventive Embodiment 8) has a rubber composition according to the present invention. The three remaining belts contain other various rubber compositions, not according to the invention, and are identified as Comparison Examples 11–13. All four belts were constructed according to the description below.

TABLE 4

| | Inventive Embodiment | Comparison Example | | (weight parts) |
|---|---|---|---|---|
| | 8 | 11 | 12 | 13 |
| chloroprene PM-40 | 100 | 100 | 100 | 100 |
| nylon cut thread | 15 | 15 | 25 | 15 |
| stearic acid | 1 | 1 | 1 | 1 |
| MgO | 4 | 4 | 4 | 4 |
| octylized diphenyl-amine | 2 | 2 | 2 | 2 |
| aromatic oil | 6 | 6 | 6 | 6 |
| carbon black N-550 | 20 | 20 | 20 | 20 |
| carbon black N-774 | 20 | 20 | 20 | 20 |
| dibenzothiazyl disulfide | 1 | 1 | — | 1 |
| ZnO | 5 | 5 | 5 | 5 |
| ethylene thiourea | 0.5 | — | 0.5 | 0.5 |
| N-N'-m-phenylene dimaleimide | 2.5 | — | — | — |
| sulfur | 1 | 1 | 1 | 1 |
| MSL (125° C.) T5 | 12 | 14 | 7.5 | 8 |
| Vm | 58 | 57 | 95 | 90 |
| hardness $H_S$ (JIS A) | 87 | 85 | 88 | 88 |
| high temperature low tension endurance test belt running life (hrs) | 125 | 136 | 76 | 68 |
| belt appearance | no tackiness | high tackiness | slight tackiness | slight tackiness |

A rubberized canvas was made by friction coating chloroprene rubber onto a plain weave fabric, with the warp and weft of cotton thread. The canvas was wound onto a cylindrical mold. An adhesive rubber sheet of chloroprene rubber was wound onto one side of the canvas. On top of the chloroprene rubber composition, a cord (1,100 d 2×3) made of polyester fiber was wrapped. A rubber layer, consisting of the rubber compositions shown in Table 4, was wound and molded on top of the cord. This assembly was then vulcanized by a known method at 160° C. for 30 minutes, and a vulcanized rubber sleeve was obtained.

The vulcanized rubber sleeve was trained around a driving and driven roller on a grinding machine and was driven with a tension applied thereto. A 150 mesh grinding wheel, with diamonds adhered to its surface, was rotated at 1600 rpm and brought into contact with the vulcanized sleeve. 80 rib parts were ground into the sleeve after which the sleeve was cut to predetermined widths yielding 3PK1100 V-ribbed belts.

In a high temperature, low tension endurance test, each ribbed belt was trained around a 120 mm diameter driving pulley (V-shaped groove angle of 40°) a 120 mm diameter driven pulley (V-shaped groove angle of 40°) and a 45 mm diameter tensioning pulley (V-shaped groove part angle of 40°). An 85 mm diameter idler pulley was brought into contact with each belt to form a contact angle of 120° between the driving pulley and the driven pulley. The testing temperature was maintained at 85° C., with the belt tension set at 40 kgf/3 ribs. The driving pulley speed was set at 4900 rpm and the driven pulley load was 12 ps. The belts were run until the ribs of each belt cracked. The running time was determined when cracks were detected.

Additionally, a turning fluctuation test was performed with each 3PK1100 V-ribbed belt. Each belt was trained around a 140 mm diameter driving pulley (V-shaped groove part angle of 40°) a 116 mm diameter driven pulley (V-shaped groove part angle of 40°), and a 73 mm diameter idler pulley (V-shaped groove part angle of 40°). An auto tensioner consisting of a flat pulley of 75 mm diameter was brought into contact with the back belt surface, while the driving pulley was rotated at 800 rpms. A 20% turning fluctuation was applied. Each belt's external appearance after 24 hours running at room temperature was then observed.

The inventive embodiments had excellent endurance with no evidence of tackiness on the belt surfaces.

The foregoing disclosure of specific embodiments is intended to be illustrative of the broad concepts comprehended by the invention.

We claim:

1. A rubber composition comprising:

chloroprene rubber;

1–20 weight parts of at least one metal oxide selected from the group consisting of zinc oxide and magnesium oxide per 100 weight parts of chloroprene rubber;

0.05–2.0 weight parts of ethylene thiourea per 100 weight parts of chloroprene rubber;

0.1–10.0 weight parts of bismaleimide per 100 weight parts of chloroprene rubber;

0.1–3.0 weight parts of at least one vulcanization accelerator selected from the group consisting of thiazole vulcanization accelerators, thiuram vulcanization accelerators, and sulfenamide vulcanization accelerators per 100 weight parts of chloroprene rubber.

2. The rubber composition according to claim 1 further comprising 5–40 weight parts of a short fiber per 100 weight parts of chloroprene rubber.

3. The rubber composition according to claim 1 wherein the chloroprene rubber is sulfur-denatured.

4. The rubber composition according to claim 1 wherein the bismaleimide comprises at least one of a) two nitrogen atoms directly bonded and b) two nitrogen atoms bonded by at least an alkylene group, a cycloalkylene group, an oxy-dimethylene group, a phenylene group, and a sulfon group.

5. The rubber composition according to claim 1 wherein the rubber composition comprises 0.5–5.0 weight parts of bismaleimide per 100 weight parts of chloroprene rubber.

6. The rubber composition according to claim 1 wherein the thiazole vulcanization accelerator comprises at least one of 2-mercaptobenzothiazole, 2-mercaptothiazoline, dibenzothiazyl disulfide, and 2-mercaptobenzothiazole zinc salts.

7. The rubber composition according to claim 1 wherein the thiuram vulcanization accelerator comprises at least one of tetramethylthiuram monosulfide, tetramethylthiuram disulfide, tetraethylthiuram disulfide, N, N'-dimethyl-N, and N'-diphenylthiuram disulfide.

8. The rubber composition according to claim 1 wherein the sulfenamide vulcanization accelerator comprises at least one of N-cyclohexyl-2-benzothiazylsulfenamide, and N, N-cyclohexyl-2-benzothiazylsulfenamide.

9. The rubber composition according to claim 1 further comprising at least one of carbon black, stearic acid, an extender, a white filler, an antioxidant, nylon, cotton, organic short fibers, and a plasticizer.

10. A power transmission belt comprising:

a belt body comprising a rubber composition, said rubber composition comprising:
chloroprene rubber;
1–20 weight parts of at least one metal oxide selected from the group consisting of zinc oxide and magnesium oxide per 100 weight parts of chloroprene rubber;
0.05–2.0 weight parts of ethylene thiourea per 100 weight parts of chloroprene rubber;
0.1–10.0 weight parts of bismaleimide per 100 weight parts of chloroprene rubber;
0.1–3.0 weight parts of at least one vulcanization accelerator selected from the group consisting of thiazole vulcanization accelerators, thiuram vulcanization accelerators, and sulfenamide vulcanization accelerators per 100 weight parts of chloroprene rubber.

11. The power transmission belt according to claim 10 wherein the power transmission belt is one of a V belt, a V-ribbed belt, a toothed/cogged belt, and a double-sided toothed/cogged belt.

12. The power transmission belt according to claim 10 wherein the belt body has a length and load carrying cords embedded in the belt body and extending in a lengthwise direction.

13. The power transmission belt according to claim 10 wherein the belt body has a plurality of teeth/cogs and the teeth/cogs comprise the rubber composition.

14. The power transmission belt according to claim 10 wherein the belt body has a compression layer and a tension layer and the compression layer comprises the rubber composition.

15. The power transmission belt according to claim 14 further comprising load carrying cords in the belt body between the compression layer and the tension layer.

16. The power transmission belt according to claim 14 wherein there are short reinforcing fibers in the rubber composition.

17. The power transmission belt according to claim 10 wherein the rubber composition comprises 0.5–5.0 weight parts of bismaleimide per 100 weight parts of chloroprene rubber.

18. The power transmission belt according to claim 10 further comprising at least one of carbon black, stearic acid, an extender, a white filler, and antioxidant, nylon, cotton, organic short fibers, and a plasticizer.

19. The power transmission belt according to claim 10 wherein the chloroprene rubber is sulfur-denatured.

20. The power transmission belt according to claim 10 wherein the belt body has an inside surface and an outside surface and there is a fabric layer on at least one of the inside and outside surfaces of the belt body.

21. The power transmission belt according to claim 16 wherein the short fibers are present in an amount of 5 to 40 weight parts per 100 weight parts of chloroprene rubber.

* * * * *